(12) United States Patent
Gräber et al.

(10) Patent No.: US 12,049,848 B2
(45) Date of Patent: Jul. 30, 2024

(54) PLANETARY GEARBOX AND GAS TURBINE ENGINE HAVING PLANETARY GEARBOX

(71) Applicant: ROLLS-ROYCE DEUTSCHLAND LTD & CO KG, Blankenfelde-Mahlow (DE)

(72) Inventors: Michael Gräber, Berlin (DE); Greg Blake, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 50 days.

(21) Appl. No.: 17/769,225

(22) PCT Filed: Oct. 7, 2020

(86) PCT No.: PCT/EP2020/078149
§ 371 (c)(1),
(2) Date: Apr. 14, 2022

(87) PCT Pub. No.: WO2021/073984
PCT Pub. Date: Apr. 22, 2021

(65) Prior Publication Data
US 2023/0272750 A1    Aug. 31, 2023

(30) Foreign Application Priority Data

Oct. 17, 2019  (DE) .................... 10 2019 128 081.8

(51) Int. Cl.
  *F02C 7/36*   (2006.01)
  *F16C 17/02*  (2006.01)
  *F16H 57/08*  (2006.01)

(52) U.S. Cl.
  CPC ............... *F02C 7/36* (2013.01); *F16C 17/02* (2013.01); *F16H 57/08* (2013.01);
  (Continued)

(58) Field of Classification Search
  CPC ........ F02C 7/36; F16C 17/02; F16C 2360/23; F16C 2361/61; F16H 57/08; F16H 2057/085; F05D 2260/40311
  See application file for complete search history.

(56) References Cited

U.S. PATENT DOCUMENTS

| 5,102,379 A | 4/1992 | Pagluica et al. |
| 5,137,425 A * | 8/1992 | Rohra ............... F02K 3/072 416/129 |

(Continued)

FOREIGN PATENT DOCUMENTS

| DE | 2702321 A1 | 7/1978 |
| DE | 69203908 T2 | 4/1996 |

(Continued)

OTHER PUBLICATIONS

Machine Translation of JP2015530536A PDF File Name: "JP2015530536A_Machine_Translation.pdf".*

(Continued)

*Primary Examiner* — Grant Moubry
*Assistant Examiner* — Ruben Picon-Feliciano
(74) *Attorney, Agent, or Firm* — SHUTTLEWORTH & INGERSOLL, PLC; Timothy J. Klima

(57) ABSTRACT

The invention relates to a planetary gearbox in a gas turbine engine wherein a plurality of planetary gears are each mounted on a planetary gear bearing journal by a slide bearing, characterized in that a bushing is arranged in an inner bore of at least one planetary gear, which bushing spatially separates the sliding surface of the slide bearing from the inner bore of the planetary gear and the bushing is designed as a replacement part, in particular as a sacrificial part. The invention also relates to a gas turbine engine.

20 Claims, 4 Drawing Sheets

(52) U.S. Cl.
CPC *F05D 2260/40311* (2013.01); *F16C 2360/23* (2013.01); *F16C 2361/61* (2013.01); *F16H 2057/085* (2013.01)

(56) References Cited

U.S. PATENT DOCUMENTS

| | | |
|---|---|---|
| 6,159,348 A | 12/2000 | Barnsby et al. |
| 2014/0309078 A1* | 10/2014 | Curti .................... F16H 1/2827 475/331 |
| 2015/0096410 A1* | 4/2015 | Newburg ................ F02N 11/00 74/7 C |
| 2016/0146112 A1 | 5/2016 | Van der Merwe et al. |
| 2018/0195601 A1 | 7/2018 | Hallman |
| 2018/0297119 A1 | 10/2018 | Clarke |

FOREIGN PATENT DOCUMENTS

| | | | |
|---|---|---|---|
| DE | 102013220063 A1 | 4/2015 | |
| EP | 0094591 A1 | 11/1983 | |
| JP | 2015530536 A * | 10/2015 | ............... F02C 7/36 |
| WO | 2018164723 A1 | 9/2018 | |

OTHER PUBLICATIONS

German Search Report dated Jun. 30, 2020 from counterpart German Patent Application No. 10 2019 128 081.8.
International Search Report and Written Opinion dated Dec. 15, 2020 from counterpart International Patent Application No. PCT/EP2020/078149.

* cited by examiner

PLANETARY GEARBOX AND GAS TURBINE ENGINE HAVING PLANETARY GEARBOX

This application is the National Phase of International Application PCT/EP2020/078149 filed Oct. 7, 2020 which designated the U.S.

This application claims priority to German Patent Application No. 102019128081.8 filed Oct. 17, 2019, which application is incorporated by reference herein.

The present disclosure relates to a planetary gear box, and to a gas turbine engine having a planetary gear box, with features as disclosed herein.

In geared fan engines, use is made of planetary gear boxes which exhibit a very high power density, because high torques are transmitted from a driving turbine to a compressor, such as for example the fan stage. Here, in the planetary gear box, use is made of plain bearings for the planet gears, which plain bearings are subjected to high mechanical and/or thermal loads. At the same time, the planetary gear boxes must have high stability. Examples of such planetary gear boxes are known for example from WO 2018/164723 A1.

It is the object to provide robust planetary gear boxes. Said object is achieved for example by way of the present disclosure 1.

In this case, a planetary gear box in a gas turbine engine has a multiplicity of planet gears which are each mounted on a planet-gear bearing journal by way of a plain bearing. Here, a bushing is arranged in an inner bore of the at least one planet gear, which bushing spatially separates the sliding surface of the plain bearing from the inner bore of the planet gear, and the bushing is in this case designed in a targeted manner as a replacement part, in particular as a sacrificial part.

The spatial separation makes it possible inter alia for damage in the plain bearing not to be able to spread, not to be able to spread as quickly, or to be able to spread only to a reduced extent, to the body of the planet gear. Basically, a plain bearing is to be understood here as meaning a bearing surface with a lubrication gap or else a separate plain-bearing bushing. In the latter case, the plain-bearing bushing may also be structurally identical to the bushing. The targeted design of the bushing as a sacrificial part brings about effective protection against damage of the planet gear box or at least a reduction thereof.

In a further embodiment, the bushing is produced from metal, a composite material or ceramic or comprises these materials. In the case of a metallic material, in particular light metals, for example aluminum, or steels with relatively low strength and/or temperature resistance come into consideration. In particular, the bushing may comprise material or consist of material that is different from the material of the planet gear.

In particular, in one embodiment, the melting temperature of the material of the bushing may be below the melting temperature of the material of the planet gear. If the bushing melts during operation on account of thermal loads, the generation of heat due to the failure of the plain bearing is—at least for a certain period of time—limited, and so a robust configuration of the planetary gear box is provided. If, for example, use is made of high-strength steel as material for the planet gears, aluminum or lead could be used as materials for the bushing, so that the materials of bushing and planet gear are different.

In one embodiment, the strength of the material of the bushing is lower than the strength of the material of the planet gear, or, with increasing temperature above the normal plain-bearing operating temperature, which occurs in the case of failure of the functionality of the plain bearing (for example at a temperature above 180° C.), the strength of the material of the bushing decreases more sharply than the strength of the material of the planet gear. In this case, too, different materials are used for the bushing and the planet gear.

In a further embodiment, the stiffness, that is to say the modulus of elasticity, of the material of the bushing is lower than the stiffness of the material of the planet gear, or, with increasing temperature above the normal plain-bearing operating temperature, which occurs in the case of failure of the functionality of the plain bearing (that is to say at a temperature above 180° C.), the stiffness of the material of the bushing decreases more sharply than the stiffness of the material of the planet gear.

This can be advantageous if the materials of bushing and planet gear are different, in particular if, in comparison with the planet-gear material, the material of the bushing has a lower stiffness at temperatures above the normal operating temperature of the plain bearing and has a lower melting temperature. In this case, an additional protective functionality of the bushing is obtained in that, through softening or melting of the bushing material, a further temperature increase in the failing plain bearing is slowed down or a drop in temperature is brought about. In this way, the temperature-driven mechanism, which also would give rise to a crack in the inner bore of the planet gear, is less pronounced or does not become pronounced to the extent necessary for crack formation at the inner bore of the planet gear.

Also, in the direction of the axis of rotation of the bushing, the bushing may have at least the same geometrical extent as the plain bearing.

In a further embodiment, the bushing is designed as a replacement part, for example as a sacrificial part. Under certain conditions, damage to the bushing is acceptable if, as a result, the planetary gear box or at least parts thereof are protected. The likelihood of secondary damage occurring at the planet gear after failure of the plain bearing is reduced by way of the bushing, or secondary damage remains limited to the bushing. In this way, further progression of damage after the occurrence of plain-bearing failure that is better behaved from the point of view of aviation safety is achieved, since, as secondary damage, fracturing of the entire planet gear is avoided and consequently for example no fracture fragments with high kinetic energy can occur as secondary damage. By contrast, damage or else fracturing of the bushing is better behaved from the point of view of aviation safety, since the mass of the bushing is significantly smaller in comparison with the mass of the planet gear and there are no relevant trajectories on which bushing fracture fragments can exit the planetary gear box.

In a further embodiment, the bushing is connected to the inner side of the inner bore of the planet gear via an interference fit, a soldered connection, an adhesive connection or a form-fit connection.

In the case of an interference fit, the ratio of the diametrical oversize of the outer diameter of the plain-bearing bushing to the outer diameter of the plain-bearing bushing may be between 0.01 and 0.00001. On the one hand, the oversize must be large enough to avoid wear due to micro relative movement at the contact surface between bushing and planet gear owing to gear loading during normal operation. On the other hand, the oversize must be small enough for the additional stress load of the planet-gear material owing to the interference fit to be supported in such a way that the sum of stress owing to interference fit and stress owing to loading of the planet gear through normal operation does not exceed the permissible stress for the planet-gear material.

It is also possible for the bushing to have a form-fit element for axial arresting relative to the planet gear.

It is also possible in one embodiment for the wall thickness $D_B$ of the bushing to correspond at least to the wall thickness $D_G$ of a plain-bearing bushing, in particular to 2 to 4 times the wall thickness $D_G$ of a plain-bearing bushing. In this way, the bushing has enough material to fulfill the protective function.

It is however also possible for the bushing to comprise the same material or consist of the same material as the planet gear. In this case, the protective functionality of the bushing for the planet gear is provided in that a crack forming at the inner diameter of the bushing owing to plain-bearing failure does not propagate, or propagates only in a delayed manner, across the contact surface between outer diameter of the bushing and inner diameter of the planet gear into the planet gear.

In one embodiment, the bushing, as replacement part (for example sacrificial part), may have a means for targeted reduction of the stiffness and/or for targeted reduction of the thermal conductivity. In particular, the means for targeted reduction of the stiffness and/or for targeted reduction of the thermal conductivity may have at least one bore in the axial direction of the bushing. The at least one bore may have for example a material which loses stiffness sooner, or melts sooner, than the material of the bushing. Consequently, the bushing may have in its interior, that is to say in the region between the outer and inner diameters—without the surfaces forming the outer or inner diameter being involved themselves—means which reduce the stiffness of the bushing and/or the thermal conductivity of the bushing in comparison with a bushing composed of solid material. In this way, an additional barrier against crack continuation is created in a targeted manner. For example, use may be made, to serve this purpose, of a series of passage bores or axial bores, distributed over the circumference of the bushing, whose diameter is smaller than the wall thickness of the bushing and whose axis lies in the region between the outer and inner diameters of the bushing.

Said bores may, for example, be filled fully or partially with a material, for example a polymer, which, under the elevated temperatures of the incipient plain-bearing failure, loses stiffness sooner, or melts sooner, than the basic material of the bushing and thus ensures an additional protective functionality, or a protective functionality which becomes active earlier in the plain-bearing failure process, for the planet gear.

In a further embodiment, the ratio of the wall thickness $D_B$ of the bushing to the thickness of the toothed ring of the planet gear is less than 0.5. Here, the radial distance between an inner radius of the toothed ring and the root circle of the teeth is regarded as the thickness of the toothed ring. In this way, the weakening of the planet gear with regard to its load transfer capacity owing to a relatively large inner bore (in comparison with an otherwise identical planet gear that would be designed without a bushing) is kept as little as possible. This also results in the mass of the bushing being kept small enough so that the kinetic energy of the largest possible fracture fragments of the bushing in the event of damage, or the kinetic energy of the bushing at maximum engine speed, is not sufficient for the external engine casing to be broken through.

Also, the bushing may have a load take-over means, resulting in a contribution to load transfer of the entire composite structure of bushing and planet gear.

Also, it is possible for the inner surface of the bushing to serve at the same time as an outer running surface for a plain bearing. For this purpose, there may be provided on the inner surface of the bushing additional features, for example a coating or hardening, or features for advantageous distribution of the fluid in the plain bearing, which serve for the functionality of the plain bearing in normal operation and which do not counteract the protective function for the planet gear in the event of plain-bearing failure.

The object is also achieved by a gas turbine engine for an aircraft having the features as disclosed herein.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear box. Accordingly, the gas turbine engine may comprise a gear box which is driven via the core shaft and whose output drives the fan in such a way that it has a lower rotational speed than the core shaft. The input to the gear box may be provided directly from the core shaft, or indirectly via the core shaft, for example via a spur shaft and/or a spur gear. The core shaft may be connected rigidly to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may furthermore comprise a second turbine, a second compressor, and a second core shaft, which connects the second turbine to the second compressor. The second turbine, the second compressor and the second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gear box may be designed to be driven by the core shaft that is configured to rotate (for example during use) at the lowest rotational speed (for example the first core shaft in the example above). For example, the gear box may be designed to be driven only by the core shaft that is configured to rotate (for example during use) at the lowest rotational speed (for example only by the first core shaft and not by the second core shaft, in the example above). Alternatively, the gear box may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, if a second compressor is provided. By way of further example, the flow at the exit of the compressor may be supplied to the inlet of the second turbine, if a second turbine is provided. The combustor may be provided upstream of the turbine(s).

The or each compressor (for example the first compressor and the second compressor as described above) may comprise any number of stages, for example multiple stages. Each stage may comprise a series of rotor blades and a series of stator blades, which may be variable stator blades (that is to say the angle of attack may be variable). The series of rotor blades and the series of stator blades may be axially offset from one another.

The or each turbine (for example the first turbine and the second turbine as described above) may comprise any number of stages, for example multiple stages. Each stage may comprise a series of rotor blades and a series of stator blades. The series of rotor blades and the series of stator blades may be axially offset from one another.

Each fan blade may have a radial span extending from a root (or a hub) at a radially inner location over which gas flows, or from a span position of 0%, to a tip at a span position of 100%. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in a closed interval delimited by two values in the previous sentence (that is to say the values may form upper or lower limits). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade over which gas flows, i.e. the portion radially outside any platform.

The radius of the fan may be measured between the engine centerline and the tip of the fan blade at its leading edge. The diameter of the fan (which can generally be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in a closed interval delimited by two of the values in the previous sentence (that is to say the values may form upper or lower limits).

The rotational speed of the fan may vary in operation. Generally, the rotational speed is lower for fans with a larger diameter. Purely as a non-limiting example, the rotational speed of the fan under cruise conditions may be less than 2500 rpm, for example less than 2300 rpm. Purely as a further non-limiting example, the rotational speed of the fan under cruise conditions for an engine having a fan diameter in the range of from 250 cm to 300 cm (for example 250 cm to 280 cm) may also be in the range of from 1700 rpm to 2500 rpm, for example in the range of from 1800 rpm to 2300 rpm, for example in the range of from 1900 rpm to 2100 rpm. Purely as a further non-limiting example, the speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in a closed interval delimited by two of the values in the previous sentence (that is to say the values may form upper or lower limits).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in a closed interval delimited by two of the values in the previous sentence (that is to say the values may form upper or lower limits). The bypass duct may be substantially annular. The bypass duct may be situated radially outside the core engine. The radially outer surface of the bypass duct may be defined by an engine nacelle and/or a fan casing.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in a closed interval delimited by two of the values in the previous sentence (that is to say the values may form upper or lower limits).

The specific thrust of an engine may be defined as the net thrust of the engine divided by the total mass flow through the engine. The specific thrust of an engine as described and/or claimed herein at cruise conditions may be less than (or of the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in a closed interval delimited by two of the values in the previous sentence (that is to say the values may form upper or lower limits). Such engines can be particularly efficient in comparison with conventional gas turbine engines.

A gas turbine engine as described and/or claimed herein may have any desired maximum thrust. Purely as a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust may be in a closed interval delimited by two of the values in the previous sentence (that is to say the values may form upper or lower limits). The thrust referred to above may be the maximum net thrust under standard atmospheric conditions at sea level plus 15° C. (ambient pressure 101.3 kPa, temperature 30° C.), with the engine static.

During use, the temperature of the flow at the entry to the high-pressure turbine can be particularly high. This temperature, which may be referred to as TET, may be measured at the exit to the combustor, for example directly upstream of the first turbine blade, which in turn may be referred to as a nozzle guide blade. At cruising speed, the TET may be at least (or of the order of): 1400 K, 1450 K, 1500 K, 1550 K, 1600 K or 1650 K. The TET at cruising speed may be in a closed interval delimited by two of the values in the previous sentence (that is to say the values may form upper or lower limits). The maximum TET in the use of the engine may be at least (or of the order of), for example: 1700 K, 1750 K, 1800 K, 1850 K, 1900 K, 1950 K or 2000 K. The maximum TET may be in a closed interval delimited by two of the values in the previous sentence (that is to say the values may form upper or lower limits). The maximum TET may occur, for example, under a high thrust condition, for example under a maximum take-off thrust (MTO) condition.

A fan blade and/or an airfoil portion of a fan blade as described and/or claimed herein may be produced from any suitable material or a combination of materials. For example, at least a part of the fan blade and/or of the airfoil may be produced at least in part from a composite, for example a metal matrix composite and/or an organic matrix composite, such as carbon fiber. By way of further example, at least a part of the fan blade and/or of the airfoil may be produced at least in part from a metal, such as for example a titanium-based metal or an aluminum-based material (such as for example an aluminum-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely by way of example, the fan blade may have a carbon-fiber-based or aluminum-based body (such as an aluminum-lithium alloy) with a titanium leading edge.

A fan as described and/or claimed herein may comprise a central portion from which the fan blades can extend, for example in a radial direction. The fan blades may be attached to the central portion in any desired manner. For example, each fan blade may comprise a fixture device which can engage with a corresponding slot in the hub (or disk). Purely by way of example, such a fixture device may be in the form of a dovetail that can be inserted into and/or be brought into engagement with a corresponding slot in the hub/disk in order for the fan blade to be fixed to the hub/disk. By way of further example, the fan blades may be formed integrally with a central portion. Such an arrangement may be referred to as a blisk or a bling. Any suitable method may be used to produce such a blisk or such a bling. For example, at least a part of the fan blades may be machined from a block and/or at least a part of the fan blades may be attached to the hub/disk by welding, such as e.g. linear friction welding.

The gas turbine engines as described and/or claimed herein may or may not be provided with a variable area nozzle (VAN). Such a variable area nozzle can allow the exit cross section of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions may be conventionally defined as the conditions during the middle part of the flight, for example the conditions experienced by the aircraft and/or the engine between (in terms of time and/or distance) end of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any speed within these ranges may be the cruise condition. In the case of some aircraft, the cruise condition may be outside these ranges, for example below Mach 0.7 or above Mach 0.9.

Purely by way of example, the cruise conditions may correspond to standard atmospheric conditions at an altitude that is in the range of from 10,000 m to 15,000 m, for example in the range of from 10,000 m to 12,000 m, for example in the range of from 10,400 m to 11,600 m (around 38,000 ft), for example in the range of from 10,500 m to 11,500 m, for example in the range of from 10,600 m to 11,400 m, for example in the range of from 10,700 m (around 35,000 ft) to 11,300 m, for example in the range of from 10,800 m to 11,200 m, for example in the range of from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8, a pressure of 23 000 Pa and a temperature of −55° C.

As used anywhere herein, "cruising speed" or "cruise conditions" may mean the aerodynamic design point. Such an aerodynamic design point (or ADP) may correspond to the conditions (including, for example, the Mach number, ambient conditions and thrust requirement) for which the fan operation is designed. This may mean, for example, the conditions under which the fan (or gas turbine engine) has the optimum efficiency in terms of construction.

During operation, a gas turbine engine as described and/or claimed herein can operate under the cruise conditions defined elsewhere herein. Such cruise conditions may be determined by the cruise conditions (for example the conditions during the middle part of the flight) of an aircraft to which at least one (for example two or four) gas turbine engine(s) can be fastened in order to provide propulsive thrust.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

Embodiments will now be described by way of example with reference to the figures, in which.

Figure 1:
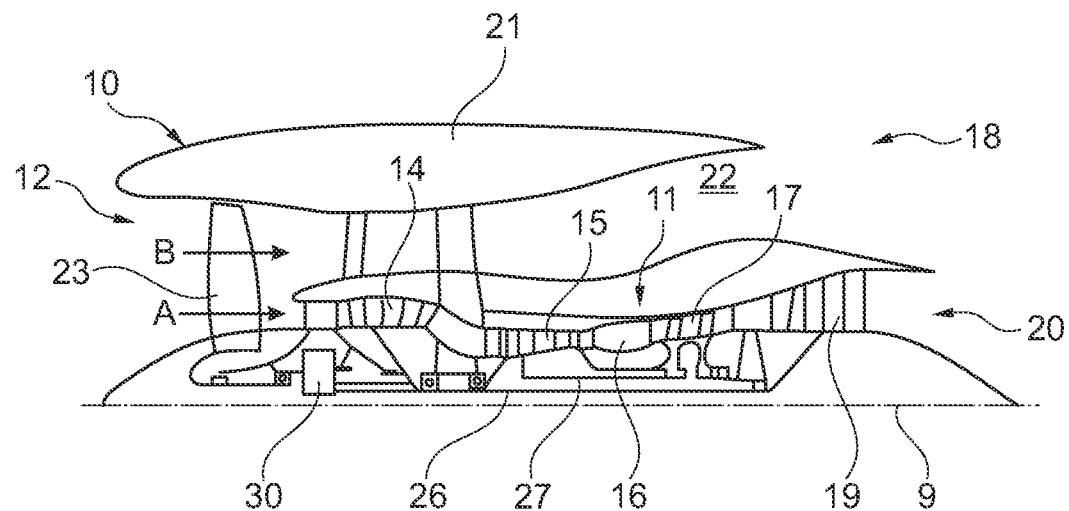
FIG. 1 shows a lateral sectional view of a gas turbine engine.

FIG. 1 illustrates a gas turbine engine 10 having a main axis of rotation 9. The gas turbine engine 10 comprises an air inlet 12 and a fan 23 which generates two air flows: a core air flow A and a bypass air flow B. The gas turbine engine 10 comprises a core 11 which receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by way of a suitable connecting shaft 27. The fan 23 generally provides the major part of the propulsive thrust. The epicyclic planetary gear box 30 is a reduction gear box.

Figure 2:
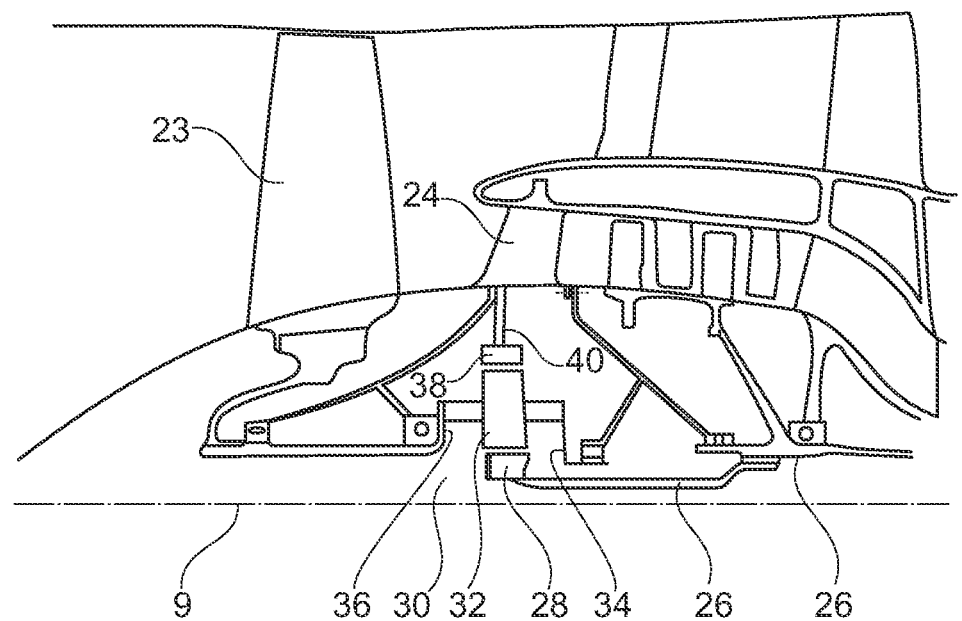
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary gear box 30. Multiple planet gears 32, which are coupled to one another by a planet carrier 34, are situated radially to the outside of the sun gear 28 and mesh therewith. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. An external gear or ring gear 38 that is coupled via linkages 40 to a stationary support structure 24 is situated radially to the outside of the planet gears 32 and meshes therewith.

Note that the terms "low-pressure turbine" and "low-pressure compressor", as used herein, may be taken to mean the turbine stage with the lowest pressure and the compressor stage with the lowest pressure (that is to say not including the fan 23), respectively, and/or the turbine and compressor stages which are connected together by the interconnecting shaft 26 with the lowest rotational speed in the engine (that is to say not including the gear box output shaft which drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 may be referred to as a first, or lowest-pressure, compression stage.

Figure 3:
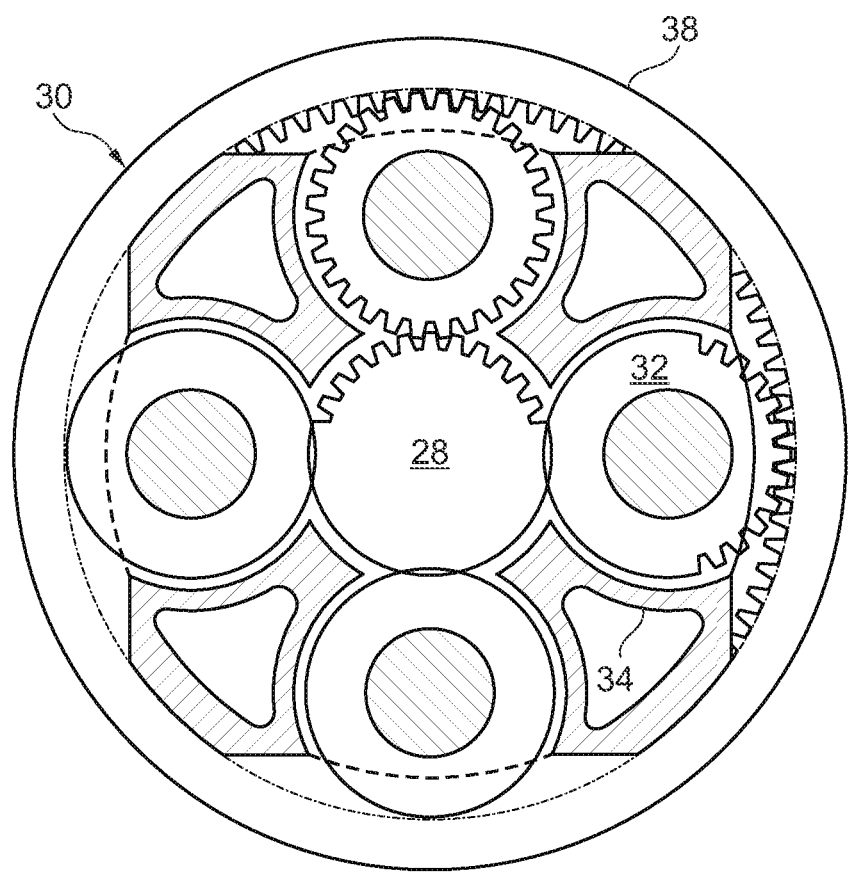
FIG. 3 shows a partially cut-away view of a gear box for a gas turbine engine.

The epicyclic planetary gear box 30 is shown in greater detail by way of example in FIG. 3. The sun gear 28, planet gears 32 and ring gear 38 in each case comprise teeth on their periphery to allow meshing with the other toothed gears. However, for clarity, only exemplary portions of the teeth are illustrated in FIG. 3. Although four planet gears 32 are illustrated, it will be apparent to a person skilled in the art that more or fewer planet gears 32 may be provided within the scope of protection of the claimed invention. Practical applications of an epicyclic planetary gear box 30 generally comprise at least three planet gears 32.

The epicyclic planetary gear box 30 illustrated by way of example in FIGS. 2 and 3 is a planetary gear box in which the planet carrier 34 is coupled to an output shaft via linkages 36, with the ring gear 38 being fixed. However, any other suitable type of planetary gear box 30 may be used. As a further example, the planetary gear box 30 may be a star arrangement, in which the planet carrier 34 is held fixed, with the ring gear (or external gear) 38 being allowed to rotate. In such an arrangement, the fan 23 is driven by the ring gear 38. As a further alternative example, the gear box 30 may be a differential gear box in which both the ring gear 38 and the planet carrier 34 are allowed to rotate.

It is self-evident that the arrangement shown in FIGS. 2 and 3 is merely an example, and various alternatives fall within the scope of protection of the present disclosure. Purely by way of example, any suitable arrangement may be used for positioning the gear box 30 in the gas turbine engine 10 and/or for connecting the gear box 30 to the gas turbine engine 10. As a further example, the connections (for example the linkages 36, 40 in the example in FIG. 2) between the gear box 30 and other parts of the gas turbine engine 10 (such as for example the input shaft 26, the output shaft and the fixed structure 24) may have a certain degree of stiffness or flexibility. As a further example, any suitable arrangement of the bearings between rotating and stationary parts of the gas turbine engine 10 (for example between the input and output shafts of the gear box and the fixed structures, such as for example the gear-box casing) may be used, and the disclosure is not limited to the exemplary arrangement in FIG. 2. For example, where the gear box 30 has a star arrangement (described above), a person skilled in the art would readily understand that the arrangement of output and support linkages and bearing positions would usually be different from that shown by way of example in FIG. 2.

Accordingly, the present disclosure extends to a gas turbine engine having any arrangement of gear box types (for example star-shaped or epicyclic-planetary), support structures, input and output shaft arrangement, and bearing positions.

Optionally, the gear box may drive additional and/or alternative components (for example the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, meaning that the flow through the bypass duct 22 has its own nozzle, which is separate from and radially outside the engine core nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure may be applied for example to any type of gas turbine engine, such as for example an open-rotor engine (in which the fan stage is not surrounded by an engine nacelle) or a turboprop engine. In some arrangements, the gas turbine engine 10 possibly does not comprise a gear box 30.

The geometry of the gas turbine engine 10, and components thereof, is/are defined by a conventional axis system, which comprises an axial direction (which is aligned with the axis of rotation 9), a radial direction (in the direction from bottom to top in FIG. 1), and a circumferential direction (perpendicular to the view in FIG. 1). The axial, radial and circumferential directions are mutually perpendicular.

The mounting of a planet gear 32 by means of a plain bearing 50 will be described in more detail below in connection with FIG. 4.

Planetary gear boxes 30 require rotation of the planet gears 32 about an axis of rotation 49 which, relative to the planet carrier 34, is fixed. During operation, the corresponding planet-gear bearings 50 (plain bearings—see FIG. 4) are subjected to very high mechanical and/or thermal loads, in particular if the planetary gear box 30 is configured in such a way that also the planet carrier 34 rotates about itself, that is to say in a planet or sun configuration of the planetary gear box 30.

In the planetary gear box 30, a fluid, for example oil, between a planet-gear bearing journal 51 and the inner bore of the planet gear 32 serves for lubrication in the plain bearing 50.

A possible cause of the failure of a plain bearing 50 is a lack of or inadequate supply of oil to the plain bearing 50. The lubricating performance can also be lowered in that particles are present in the bearing gap, for example due to contaminants in the oil, so that the friction is increased. The thermal load in the plain bearing 50 can lead to deformations, which further increase the friction.

Such a plain-bearing failure occurrence leads within a short time to a great increase in the temperatures in the region of the planet-gear inner bore and of the planet-gear journal 51. The mechanical stresses which occur in the process can give rise to cracks or fractures in the material, especially in the regions of the planet-gear inner bore and of the planet-gear bearing journal 51.

Failure of the plain bearing 50 can result in secondary failure of other structural elements in the planetary gear box 30. Such secondary failure can for example be fatigue failure or failure on account of an excessively high temperature.

Fatigue loading is brought about essentially by the torque transmitted by the planetary gear box 30 and/or by the centrifugal forces at the rotating planet gear 32 that occur during operation.

This secondary damage occurs very rapidly since the cyclical loading occurs once per revolution of the planet gear. Further propagation of cracks then leads for example to fracturing of the planet-gear main body. A consequence of such failure of the planet-gear main body can for example be the release of high-energy deposits, which results from an exploded planetary gear box 30 and/or from seizing of the planetary gear box 30.

Such failure scenarios are undesirable particularly in an aircraft engine 10.

Figure 4:
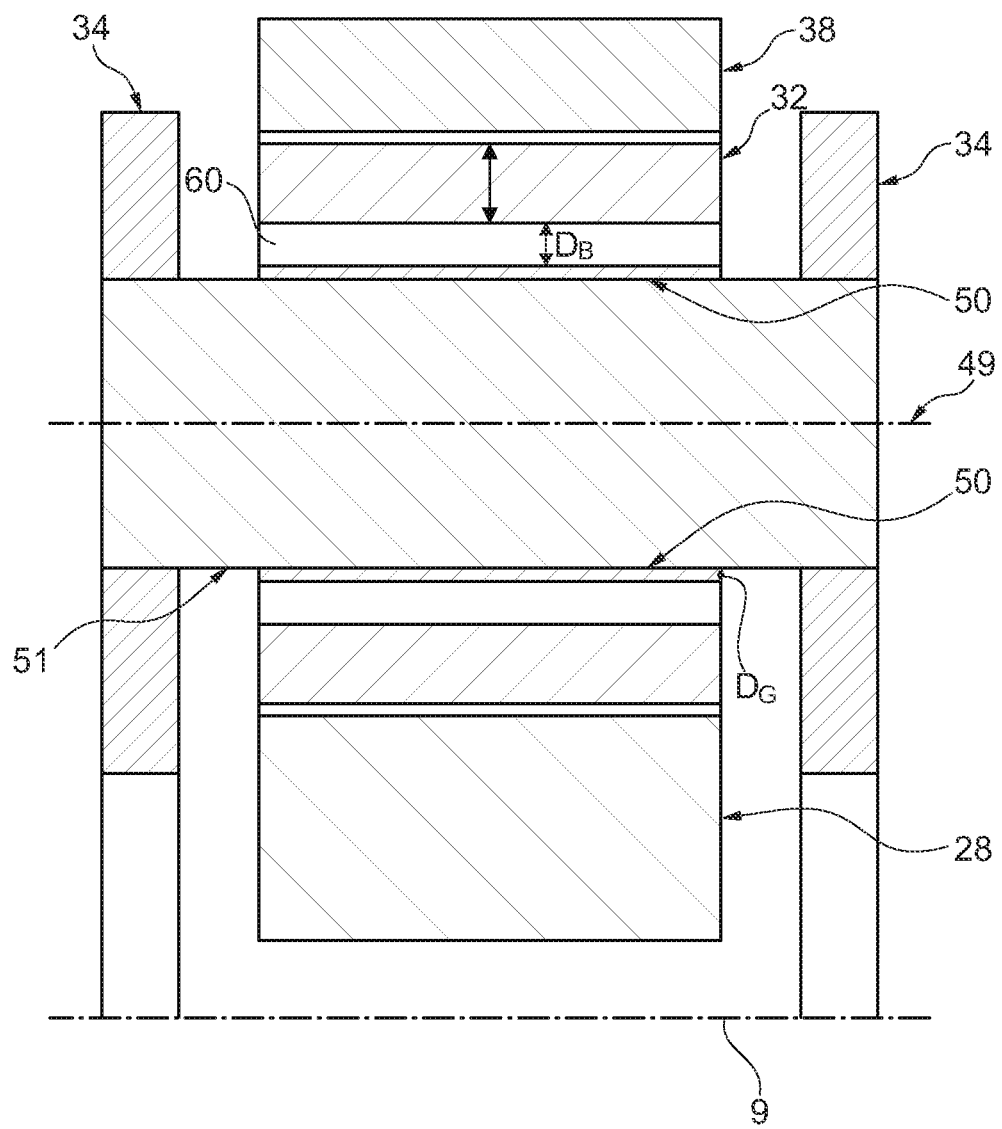
FIG. 4 shows an embodiment of a planetary gear box with a plain bearing of a planet gear with a bushing.

A description is given in connection with FIG. 4 of an embodiment of a planetary gear box 30 in the case of which the problems described can be prevented or at least minimized. A consequence of such failure of the planet-gear main body can for example be the release of fracture fragments with high kinetic energy, which results from a fractured planet gear 32. Furthermore, this can result in seizing of the planet gear 32 or blockage of the planetary gear box 30 owing to fracture fragments entering at still intact tooth engagements.

Here, the illustrated embodiment has a bushing 60 (that is to say essentially a component in the form of a hollow cylinder), which is arranged in the inner bore of the planet gear 32. The bushing 60 serves here as a replacement part, in particular as a sacrificial part, which is deformable in the event of damage.

The bushing 60 thereby spatially separates the bearing surface of the plain bearing 50 from the actual body of the planet gear 32. The plain bearing 50 is consequently surrounded circumferentially at the outside by the bushing 60. Here, the bushing 60 may be arranged on the inner side of the inner bore of the planet gear 32 via an interference fit. In another embodiment, the connection may also be produced by a soldered connection, an adhesive connection or a form-fitting connection.

In FIG. 4, the plain bearing 50 is illustrated as a separate plain-bearing bushing with a wall thickness $D_G$. In an alternative embodiment, the plain bearing 50 is formed by a bearing surface, that is to say a bearing gap, that is to say no separate plain-bearing bushing is present. The bushing 60 can then act as a plain-bearing bushing.

In the event of bearing damage, as has been described above for example, cracks in the planet gear 32 can occur. Due to the bushing 60, thermal and/or mechanical separation of the planet gear 32 from the plain bearing 50 is realized, so that a crack formation cannot propagate beyond the boundary between bushing 60 and planet gear 32. This allows for example thermally induced cracks to be prevented from propagating by the bushing. Also, the above-described secondary damage to structural elements of the planetary gear box 30 can be avoided or reduced.

Here, the bushing 60 may be designed as a replacement part or sacrificial part if said bushing, for example in a targeted manner under particular load conditions at the plain bearing 50, is destroyed and/or melted.

The wall thickness of the bushing 60 may be dimensioned such that the temperature gradients and/or high temperatures that occur in the event of bearing damage are accommodated in the bushing volume and the planet gear is thus protected against these, specifically until the bushing 60 fractures or melts precisely on account of these temperature gradients and/or high temperatures and consequently interrupts further generation of thermal energy in the failing plain bearing 50.

If, during operation, the plain bearing 50 were to fracture on account of the mechanical and/or thermal loads, the damage would be limited toward the outside by the bushing 60, wherein said bushing, in the manner of a sacrificial part, can under some circumstances even accommodate loads itself before said loads penetrate into the planet gear 32.

Here, the wall thickness $D_B$ of the bushing 60 is at least as large as, in particular 2 to 4 times as large as, the wall thickness $D_L$ of a plain-bearing bushing 50.

Figure 5:
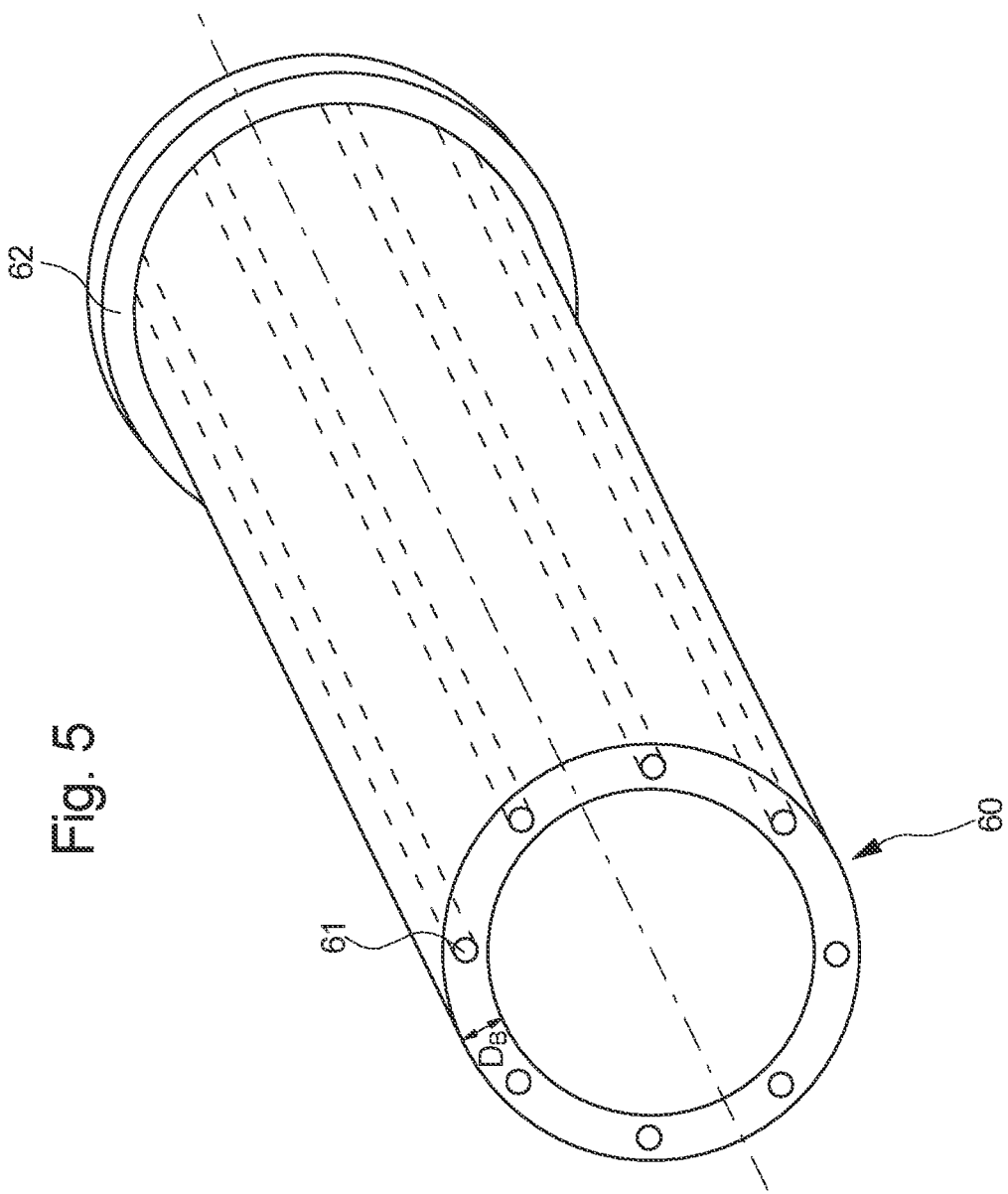
FIG. 5 shows an embodiment of a bushing with means for targeted reduction of the stiffness and/or for targeted reduction of the thermal conductivity.

FIG. 5 illustrates an embodiment of a bushing 60 having further features, which can be realized individually or else jointly.

If the bushing 60 is to be deformed as a sacrificial part in the event of damage, then it is possible to provide the bushing 60 with means for targeted reduction of the stiffness (compressive strength, torsional stiffness) and/or with means for targeted reduction of the thermal conductivity.

The embodiment as per FIG. 5 has a series of passage bores 61 which extend axially through the wall of the bushing 60. Said passage bores 61 serve as means for targeted reduction of the stiffness, since they provide targeted material weakening. Since the passage bores 61 in the illustrated embodiment are filled with air or, in operation, also with oil, they are at the same time also a means for reduction of the thermal conductivity, since air or oil conducts heat less effectively than the metal of the bushing 60. The eight passage bores 61 are arranged here symmetrically around the circumference of the bushing 60. In other embodiments, more or fewer passage bores 61 may be used.

It is also possible to at least partially fill the passage bores 61 for example with a polymer. This makes it possible for the stiffness and the thermal conductivity to be set in a targeted manner. A polymer is an example of a material which loses stiffness sooner, or melts sooner, than the metallic material of the bushing 60.

In FIG. 5, the bushing 60 furthermore also has a form-fit element 62 for axial arresting relative to the planet gear 32 (not illustrated here). In the illustrated embodiment, the form-fit element 62 is a flange encircling the circumference.

Also, the mass of the largest possible individual fracture fragment from this composite structure in relation to the mass of the largest possible individual fracture fragment from a planet gear without bushing that is otherwise identical can be reduced to such an extent that the kinetic energy of the individual fracture fragment at maximum engine speed is not sufficient for the external engine casing to be broken through.

In particular for such an embodiment, the ratio of the wall thickness $D_B$ of the bushing 60 to the thickness of the toothed ring of the planet gear 32 may be greater than one quarter. The thickness of the toothed ring is the radial distance between the inner radius of the toothed ring and the root circle of the teeth. In this embodiment, the bushing serves primarily not for protecting the planet gear against cracking, but for reducing the scale of the consequences of cracking in the planet gear to consequences not relevant to aviation safety.

It is self-evident that the invention is not limited to the embodiments described above, and various modifications and improvements can be made without departing from the concepts described herein. Any of the features may be used separately or in combination with any other features, unless they are mutually exclusive, and the disclosure extends to and includes all combinations and subcombinations of one or more features that are described herein.

LIST OF REFERENCE SIGNS

9 Main axis of rotation
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary support structure
26 Shaft
27 Connecting shaft
28 Sun gear
30 Gear box
32 Planet gears
34 Planet carrier
36 Linkage
38 Ring gear
40 Linkage
49 Axis of rotation of planet gear
50 Plain bearing for planet gear
51 Planet-gear bearing journal
60 Bushing for inner bore of a planet gear
61 Passage bore
62 Form-fit element for axial arresting
A Core air flow
B Bypass air flow
$D_B$ Wall thickness of bushing
$D_G$ Wall thickness of plain bearing

The invention claimed is:

1. A planetary gear box in a gas turbine engine, comprising:
a plurality of planet gears each mounted on a planet-gear bearing journal by way of a plain bearing,
a bushing arranged in an inner bore of at least one of the planet gears, the bushing spatially separating a sliding surface of the plain bearing from an inner bore of the at least one of the planet gears, and
the bushing being configured as a sacrificial part;
wherein the bushing has a mechanism for targeted reduction of at least one chosen from a stiffness and a thermal conductivity of the bushing, wherein the mechanism for targeted reduction of at least one chosen from the stiffness and the thermal conductivity of the bushing includes at least one bore extending in an axial direction of the bushing and being positioned in a wall thickness of the bushing between an inner diameter and an outer diameter of the bushing;
wherein a ratio of a wall thickness of the bushing to a thickness of a toothed ring of the at least one of the planet gears is less than 0.5.

2. The planetary gear box as claimed in claim 1, wherein the bushing is produced from or comprises a first material including a metal, a composite material or a ceramic material, the first material being different from a second material of the planet gear.

3. The planetary gear box as claimed in claim 1, wherein a melting temperature of a first material of the bushing is below a melting temperature of a second material of the planet gear.

4. The planetary gear box as claimed in claim 1, wherein a strength of a first material of the bushing is lower than a strength of a second material of the planet gear, or, with increasing temperature above a normal plain-bearing operating temperature, which occurs in a case of failure of functionality of the plain bearing, the strength of the first material of the bushing decreases more sharply than the strength of the second material of the planet gear.

5. The planetary gear box as claimed in claim 1, wherein a stiffness of a first material of the bushing is lower than a stiffness of a second material of the planet gear, or, with increasing temperature above a normal plain-bearing operating temperature, which occurs in a case of failure of functionality of the plain bearing, the stiffness of the first material of the bushing decreases more sharply than the stiffness of the second material of the planet gear.

6. The planetary gear box as claimed in claim 1, wherein, in a direction of an axis of rotation of the bushing, the bushing has at least a same geometrical extent as the plain bearing.

7. The planetary gear box as claimed in claim 1, wherein the bushing is connected to an inner side of the inner bore of the planet gear via an interference fit, a soldered connection, an adhesive connection or a form-fit connection.

8. The planetary gear box as claimed in claim 7, wherein, where there is an interference fit, a ratio of a diametrical oversize of an outer diameter of the bushing to the outer diameter of the bushing is between 0.01 and 0.00001.

9. The planetary gear box as claimed in claim 1, wherein the bushing has a form-fit element for axial arresting relative to the planet gear.

10. The planetary gear box as claimed in claim 1, wherein a wall thickness of the bushing corresponds at least to a wall thickness of the plain-bearing.

11. The planetary gear box as claimed in claim 1, wherein the bushing comprises a same material or consists of the same material as the planet gear.

12. The planetary gear box as claimed in claim 1, and further comprising a bore material positioned in the at least one bore, the bore material losing stiffness sooner, and/or melting sooner than aa material of the bushing.

13. The planetary gear box as claimed in claim 1, wherein the bushing has a load take-over mechanism, resulting in a contribution to a load transfer of an entire composite structure of bushing and planet gear.

14. The planetary gear box as claimed in claim 1, wherein an inner surface of the bushing also serves as an outer running surface of the plain bearing.

15. A gas turbine engine for an aircraft, comprising the following:
a core engine which comprises a turbine, a compressor, and a core shaft connecting the turbine to the compressor;
a fan which is positioned upstream of the core engine, wherein the fan comprises multiple fan blades; and
a gear box which is driven by the core shaft, wherein the fan is driven by the gear box at a lower rotational speed than the core shaft, wherein the gear box is the planetary gearbox as claimed in claim 1.

16. The gas turbine engine as claimed in claim 15, wherein:
the turbine is a first turbine, the compressor is a first compressor, and the core shaft is a first core shaft;
the core engine further comprises a second turbine, a second compressor, and a second core shaft, which connects the second turbine to the second compressor; and
the second turbine, the second compressor, and the second core shaft are arranged to rotate at a higher rotational speed than the first core shaft.

17. The planetary gear box as claimed in claim 1, wherein a wall thickness of the bushing is at least 2 to 4 times a wall thickness of the plain-bearing.

18. The planetary gear box as claimed in claim 1, wherein the at least one bore extending in the axial direction of the bushing and being positioned in the wall thickness of the bushing between the inner diameter and the outer diameter of the bushing includes a plurality of bores distributed around a circumference of the bushing.

19. A planetary gear box in a gas turbine engine, comprising:
a plurality of planet gears each mounted on a planet-gear bearing journal by way of a plain bearing,
a bushing arranged in an inner bore of at least one of the planet gears, the bushing spatially separating a sliding surface of the plain bearing from an inner bore of the at least one of the planet gears, and
the bushing being configured as a sacrificial part;
wherein the bushing has a mechanism for targeted reduction of at least one chosen from a stiffness and a thermal conductivity of the bushing, wherein the mechanism for targeted reduction of at least one chosen from the stiffness and the thermal conductivity of the bushing includes at least one bore extending in an axial direction of the bushing and being positioned in a wall thickness of the bushing between an inner diameter and an outer diameter of the bushing;
wherein the at least one bore extending in the axial direction of the bushing and being positioned in the wall thickness of the bushing between the inner diameter and the outer diameter of the bushing includes a plurality of bores distributed around a circumference of the bushing.

20. A planetary gear box in a gas turbine engine, comprising:
a plurality of planet gears each mounted on a planet-gear bearing journal by way of a plain bearing,
a bushing arranged in an inner bore of at least one of the planet gears, the bushing spatially separating a sliding surface of the plain bearing from an inner bore of the at least one of the planet gears, and
the bushing being configured as a sacrificial part;
wherein the bushing has a mechanism for targeted reduction of at least one chosen from a stiffness and a thermal conductivity of the bushing, wherein the mechanism for targeted reduction of at least one chosen from the stiffness and the thermal conductivity of the bushing includes at least one bore extending in an axial direction of the bushing and being positioned in a wall thickness of the bushing between an inner diameter and an outer diameter of the bushing;
wherein a wall thickness of the bushing is at least 2 to 4 times a wall thickness of the plain-bearing.

* * * * *